United States Patent [19]

Reinartz et al.

[11] Patent Number: 4,929,038

[45] Date of Patent: May 29, 1990

[54] HYDRAULIC UNIT

[75] Inventors: Hans-Dieter Reinartz, Frankfurt am Main; Helmut Steffes, Hattersheim, both of Fed. Rep. of Germany

[73] Assignee: Alfred Teves GmbH, Frankfurt am Main, Fed. Rep. of Germany

[21] Appl. No.: 239,487

[22] Filed: Sep. 1, 1988

[30] Foreign Application Priority Data

Sep. 2, 1987 [DE] Fed. Rep. of Germany ....... 3729216

[51] Int. Cl.$^5$ .......................... F15B 13/08; B60T 8/32; B60K 28/16
[52] U.S. Cl. .................................... 303/119; 137/884; 137/596.17; 303/113
[58] Field of Search ................. 303/119, 113; 137/884, 137/596.17

[56] References Cited

U.S. PATENT DOCUMENTS

| | | | |
|---|---|---|---|
| 2,871,886 | 2/1959 | Obrebski et al. | 137/884 X |
| 3,631,881 | 1/1972 | Bowditch | 137/884 |
| 3,726,311 | 4/1973 | Ishihara et al. | 137/596.17 |
| 4,696,465 | 9/1987 | Takeda et al. | 303/119 |
| 4,785,848 | 11/1988 | Leiber | 137/884 X |

FOREIGN PATENT DOCUMENTS

| | | |
|---|---|---|
| 2303474 | 8/1974 | Fed. Rep. of Germany . |
| 3529276 | 2/1987 | Fed. Rep. of Germany . |
| 3701019 | 7/1988 | Fed. Rep. of Germany . |
| 1019855 | 2/1966 | United Kingdom ........... 137/596.17 |
| 8302811 | 8/1983 | World Int. Prop. O. .......... 137/884 |

*Primary Examiner*—Andres Kashnikow
*Assistant Examiner*—Matthew C. Graham
*Attorney, Agent, or Firm*—Robert P. Seitter

[57] ABSTRACT

The invention relates to a hydraulic unit for a hydraulic control device, in particular to a braking pressure control device as used in anti-skid control systems. Such hydraulic units include standardized valve blocks with electromagnetically operable valves. The standardization of the valve blocks implies that the pressure medium connections of the valve blocks have predetermined positions. The invention employs a distributing plate which has a system of channels, in particular in the form of punchings, and which, in a freely selectable manner, connects the valve blocks' connections, the positions of which cannot be changed, with connections of the other components of the control device. The invention provides good preconditions for manufacturing a large number of variants of hydraulic connections, thereby allowing series production of various configurations of braking pressure control devices for anti-skid control systems which are less expensive. Adaptation to client's wishes can be effected more flexibly when using the present invention.

21 Claims, 2 Drawing Sheets

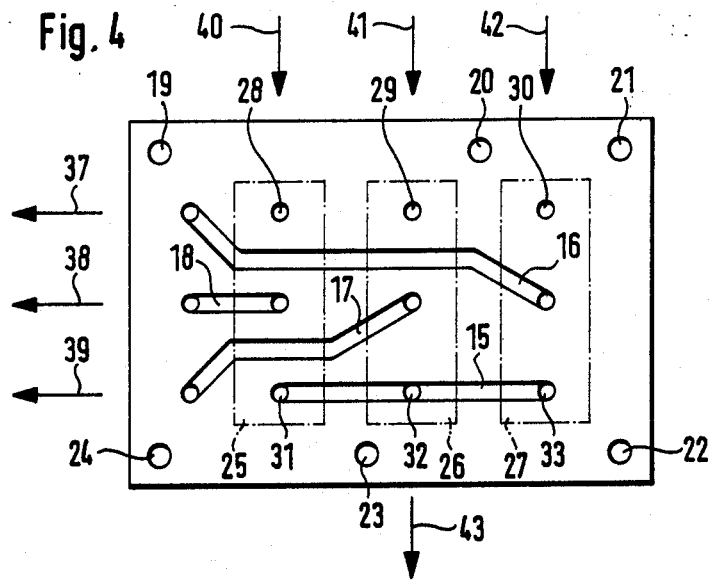
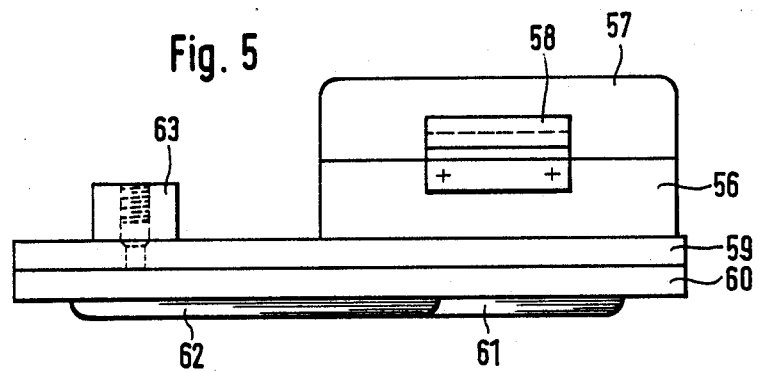
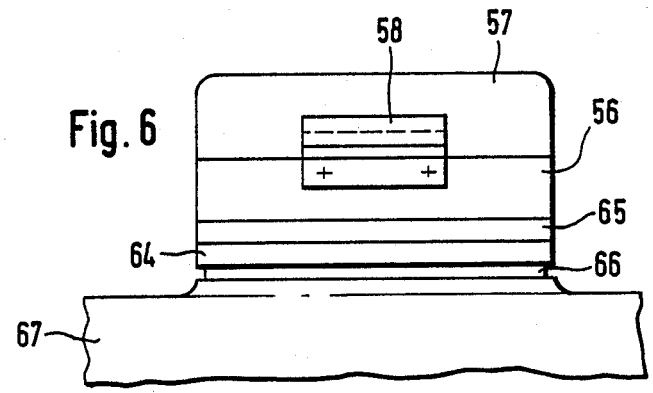

HYDRAULIC UNIT

BACKGROUND OF THE INVENTION

The invention relates to a hydraulic unit for a hydraulic control device, in particular to a braking pressure control device used in anti-skid or traction slip control systems, having at least one valve block with a group of electromagnetically operable valves and with a connection element for other components of the control device.

The use of electrohydraulic control devices has become more and more widespread in engineering. The reason for this is the possibility of designing the control part of a control system as an electric part and designing the energy part as a hydraulic part. The electromagnetically operated hydraulic valves belong to the boundaries between the electric and hydraulic parts. The valves are combined into assemblies commonly referred to as valve blocks. The assemblies have hydraulic supply and delivery lines and one or more cable outlets.

In commonly owned patent application No. P 3701019.0 a valve block is described for a slip-controlled hydraulic brake system consisting of a valve-receiving element capable of receiving several solenoid valves, a frame, a cover enclosing the frame, and a plug assembly containing a plurality of contact blades, with the solenoid valves connected with the contact blades by means of a contacting foil. The particular feature of this valve block resides in the frame, cover and plug assembly being designed in one piece so as to form a one-piece covering unit permitting the soldering of the contacting foil and fastening in a sealed manner at the valve-receiving element.

German patent application No. P 2303474 and the corresponding U.S. Pat. No. 3,977,625 disclose a pressure medium distributing block with connections for inlet and outlet lines. The connections are provided at least on one side and connected among one another. In each case certain parts of the connection path between the connections are lockable by plugs. In this pressure medium distributing block the connection path between the connections is formed by grooves inserted into the surface of the distributing block.

German published patent application No. P 3529276 and the corresponding U.S. Pat. No. 4,709,945 describe a block-shaped or plate-shaped connection element for connecting the equipment with valves or other components. On the one hand, the connection elements end in an equipment surface adapted for placement of the valves and, on the other hand, the connection element ends in a connection side for connecting a pressure medium line or the like. In the area of an end associated with the connection side, the one flow channel provided at the minimum is connected with a passage channel following the flow channel. The connection of the flow channel is effected by means of both a channel section with a threaded portion extending into its interior and by means of a socket. The socket, e.g., via a further channel section, follows the flow channel coaxially or in parallel with the axis and is shaped in one piece to the connection side from which it protrudes outwardly. The pressure medium line or the like to be connected is alternatively screwable within the threaded portion or mountable onto the socket.

The above-mentioned German patent application No. P 3701019.0 discloses an electromagnetically operable hydraulic valve. Such valves are combined into blocks of two and four, or into multiple blocks. The blocks are standardized and manufactured in large batch quantities. Due to this mass production, the valve blocks become relatively inexpensive. On the other hand, such valve blocks have the following disadvantages in practice.

The pressure medium inlets and outlets are uniformly designed in accordance with set standards. Individual adaptation of the position of the pressure medium inlets and outlets to the components of a hydraulic control device is impossible. Therefore, it is very difficult to use the known valve blocks in order to meet individual client's wishes. Series production of control systems using standardized valve blocks requires a lot of effort and is expensive.

Further, control devices equipped with standardized valve blocks are heavy and in many cases imply undesirably large space requirements which is a disadvantage. This is due to the fact that special devices are needed in order to connect the standardized inlets and outlets of the valve blocks with the inlets and outlets of the other parts of the control device.

SUMMARY OF THE INVENTION

The present invention seeks to avoid the described disadvantages of the prior art.

Standardized valve blocks are made usable universally. The pressure medium inlets and outlets of the electromagnetically operable hydraulic valves, the positions of which are predetermined by the standardization of the valve blocks, are connectable in a simple and, inexpensive manner with pressure medium inlets and outlets of the other components of control devices, which latter inlets and outlets are arranged in any position. Specific wishes of clients with regard to circuitry, and special wishes with regard to the design of the hydraulic channel system, are realized despite standardized valve blocks being used. Simultaneously, while using standardized valve blocks, it is possible to produce control devices with individually designed circuitry and channel systems in large series in a relatively simple manner.

In particular, standardized so-called SO valves and SG valves are used preferably in blocks wherein an individual SO valve and an individual SG valve are arranged in pairs. Despite using standardized blocks of two or more valve block types it is possible to meet individual wishes of clients with regard to the channel systems following the SO valves and SG valves. SO valves are "Stromlos-Offen" valves which means that the valve will be in its open position when the valve coil of the solenoid valve is not activated by an electric current. SG valves are "Stromlos-Geschlossen" valves which means that the valve will be in its locking or closed position when the valve coil of the solenoid valve is not activated by an electric current.

Large quantity production of hydraulic compact units, such as for anti-skid control systems and traction slip control systems, is possible while using standardized valve blocks with SO and SG values. At the same time, the compact units comply with individual specific wishes of clients in regard to the arrangement of the hydraulic lines and the design of the hydraulic circuitry.

A further object of this invention is to provide a simple way of checking the function of the solenoid valves, in particular the SO and SG valves. Simple inspection of the valve seats is possible when manufactured in accordance with the teachings of the present invention.

It is further an object of this invention to provide good preconditions for easy mounting of pressure medium filters, and this possibly in the very immediate vicinity of the pressure medium inlets and pressure medium outlets of the SO and SG valves. Further, by means of this invention, the danger of the valves' becoming soiled is reduced and the operational reliability of the valves is increased.

According to this invention, the pressure medium inlets and outlets of the electromagnetically operable valves which are to be connected with pressure medium inlets and outlets of other components of the control device, are arranged in the area of an external surface of the valve block. The pressure medium inlets and outlets of the control device, are arranged in the area of an external surface of a connection element of the control device. At least one distributing element is provided which has pressure medium channels which connect inlets and outlets of the valve block, on the one hand, and of the control device, on the other hand, with each other, the inlets and outlets being associated in terms of circuitry.

It can be provided that the external surface of the valve block, on the one hand, and the external surface of the distributing element, on the other hand, are arranged so as to abut on each other and that the valve block and the distributing element in this way form a channel system. In the same way, the external surfaces of the connection element, on the one hand, and the external surface of the distributing element, on the other hand, can be arranged so as to abut on each other whereby correspondingly a channel system is formed. Further, the external surfaces of the valve block, the distributing element, and the connection element can be arranged so as to abut on each other.

In a preferred embodiment, it is provided that the connection element is designed as a base plate and, in particular, carries the hydraulic connections for the control device. The base plate can be an integral part of the control device, in particular of the hydraulic compact unit of a braking pressure control device for antiskid control systems and traction slip control systems. The base plate itself can have channels forming a channel system together with the channels of the distributing element. Further, parts of the control device, in particular of the braking pressure control device, can be accommodated in the base plate.

The inventive distributing element preferably is designed as a distributing plate of steel with channels. The channels can be formed by punchings. In another embodiment, the channels are formed by indented grooves. In addition, the distributing plate can be designed as a casting with channels produced during casting. The distributing plate an be arranged between the valve block and the base plate. On the other hand, it is possible to arrange the base plate between the valve block and the distributing plate.

Another embodiment provides at least one sealing plate which abuts on the distributing plate, which seals the channels of the distributing plate, and which preferably has channels of its own which, together with the channels of the distributing plate, form a channel system. It can also be provided that the distributing plate is arranged between two sealing plates.

To practice this invention in connection with a hydraulic compact unit of a braking pressure control device for anti-skid control systems or traction slip control systems, two sealing plates can be arranged between the valve block and the compact unit which receive at least one distributing plate between them.

Developing the inventive basic idea further, a plurality of distributing plates can be provided which are arranged in the form of a combined package, the channels of the distributing plates being connected with one another and forming a channel system. The distributing plate package can be produced by soldering, in particular in a furnace.

In a further embodiment it is possible to provide printed rubber seals in the area of the channels and the pressure medium inlets and outlets.

In a further design of this invention, in the area of the external surface of the valve block, the pressure medium inlets and outlets can be equipped with pressure medium filters which can be mounted and/or inspected or exchanged when necessary during assembly or removal of the distributing plate or the base plate. In this way, the SO and SG valves, in particular the valve seats, are kept free from dirt contained in the pressure medium. Thereby, the overall operation of the control device will become more reliable.

By using the distributing plate, the solenoid valves' inlets and outlets are arranged in a standardized manner and can be connected with connections of the other components of the control device which may be arranged in any position. Thus it is possible to work with uniform valve blocks. Depending on the clients' wishes, it is possible to mount one or more blocks on one common distributing plate or base plate.

Crossing a hydraulic line over other hydraulic lines is possible in a simple way by departing from the distributing plate's plane, e.g., and going to the plane of the base plate or to the plane of a second distributing plate. This results in a considerable simplification and, therefore, reduces the cost of manufacture. In the devices of the prior art it was always necessary to provide special bores. The special bores left blind outlets that required blocking or plugging.

The hydraulic lines can be manufactured at low costs by punching or indenting steel plates. The prior practice of manufacturing hydraulic lines by machining is comparatively more expensive. Hydraulic connections advantageously can be bought separately as standardized parts and, e.g., can be mounted on the inventive base plate.

It is possible to use a valve block with the smallest standardized dimensions. The base plate and the distributing plate can be adapted to the specific wishes of clients. The base plate may serve to receive the valve blocks. By inserting the distributing plate it is possible to arrange any number of valve pairs consisting of SO and SG valves.

It is not necessary to permanently adjust the valve block assembly due to changing wishes of clients. By inserting the distributing plate expensive channel bores are replaced by simple slots in a punched sheet metal component. In a simple way, it is thus possible to arrange the pipe connections as well as hydraulic control units, valves, and other hydraulic functional elements on or in the base plate. Moreover, the base plate may be manufactured of aluminum. This will result in a considerable reduction in weight of the entire control device.

The electromagnetic part of the control device can always be mounted on the same steel plate following one bore pattern. The electromagnetic part can be kept very small, since special pipe connections are no longer necessary. The overall unit needs less components.

In many applications, up to now, blocks of four or eight valves had to be used. In the present invention, it will be possible to use blocks of two, only. Quality control checks made during manufacture sometimes reveal defective valve blocks, making it necessary to replace the defective block with a functioning block. In the case of blocks of four or eight valves, the resulting exchange was correspondingly expensive. According to the present invention when only blocks of two valves are used, this exchange is correspondingly cheaper. Thus refuse costs are minimized.

A special problem exists in the solenoid valves becoming soiled by pollutants in the pressure medium. By arranging a distributing plate at a valve block, which—in a way—is evenly cut, it now is possible to arrange pressure medium filters in the area of the connection surface of the valve block in a simple manner. Moreover, it is advantageously possible to inspect, clean, and repair the valve seats of the solenoid valves by removing the distributing plate. Thus, simple maintenance and an increase in operational reliability of the overall unit is achieved.

Further details of this invention can be gathered from the following description of several embodiments of this invention.

BRIEF DESCRIPTION OF THE DRAWING

These embodiments are described with reference to six Figures.

FIG. 4 shows a top view of a distributing plate.

FIGS. 5 and 6 each show a further embodiment as regards the arrangement of a valve block, a distributing plate, and a base plate with respect to each other.

DETAILED DESCRIPTION OF A PREFERRED EMBODIMENT

Figure 1:
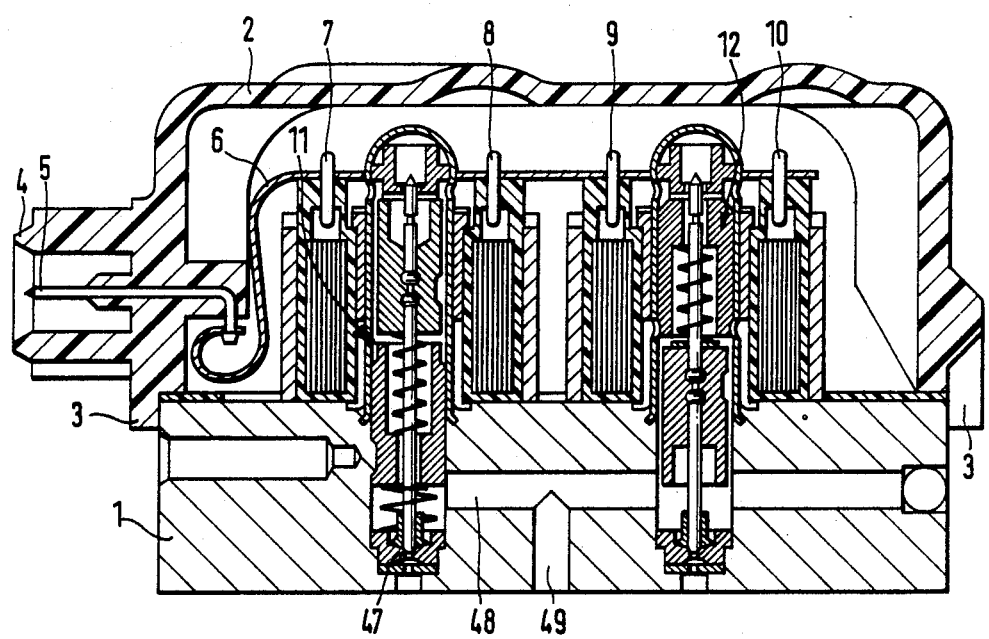
FIG. 1 shows a sectional representation of a valve block of two valves.
Figure 2:
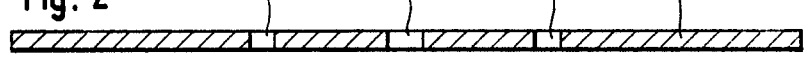
FIG. 2 shows a sectional representation of a distributing plate.
Figure 2:
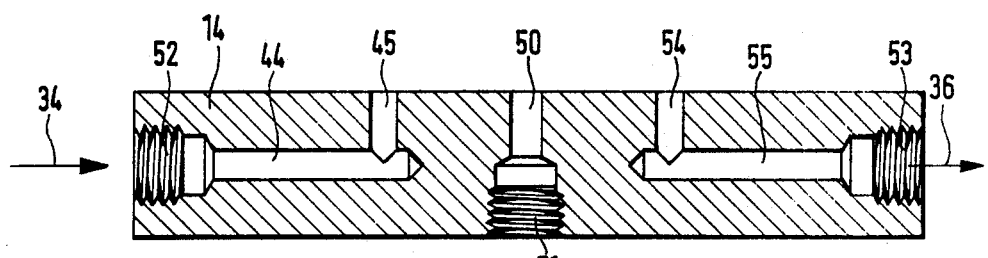
Figure 3:
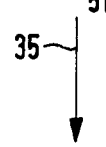
FIG. 3 shows a sectional representation of a base plate.

The valve block represented in FIG. 1 includes a valve-receiving element 1 and a cover 2. The cover 2 includes a frame 3, and a plug assembly 4 with a contact blade 5. Reference numeral 6 marks a contacting foil connecting the contact pins 7, 8, 9, and 10 with the contact blade. Reference numeral 11 marks an SO valve, commonly referred to as a normally open valve. Reference numeral 12 marks an SG valve, commonly referred to as a normally closed valve. Any further details of this valve block can be gathered from patent application No. P 3701019.0, which is incorporated herein by reference. The sectional representations in FIGS. 2 and 3 are taken along the same plane as shown in FIG. 1. The distributing plate 13 is depicted in FIG. 2. FIG. 3 illustrates the base plate 14. The individual parts of the invention, namely the valve block, distributing plate, and base plate are individually represented in FIGS. 1, 2, 3. The parts are screwed together in a sealed manner and form a hydraulic unit with a special-design channel system.

FIG. 4 is a top view of the distributing plate 13 showing a part of the channel system. The channel system is formed by the slots 15, 16, 17, and 18. The slots are punched out of the distributing plate 13, which is made from sheet metal as shown in FIG. 2. Reference numerals 19, 20, 21, 22, 23, and 24 refer to holes for the screwed connections, by means of which the valve block, the distributing plate, and the base plate are screwed together. The dash-dot lines 25, 26, and 27, each represent the outline of one valve pair. Each valve pair includes an SO valve and an SG valve. Reference numerals 28, 29, and 30 refer to the individual valve openings of the SO valves. Reference numerals 31, 32, and 33 mark the individual valve openings of the SG valves.

In FIG. 3, reference numeral 34, in the form of an arrow, marks the pressure medium line from the pressure medium source to the valve blocks. Arrow 35 marks the pressure medium line to a wheel cylinder. Arrow 36 marks the pressure medium line for returning pressure medium into an unpressurized storage reservoir.

In FIG. 4, arrow 37 marks the pressure medium line to a wheel cylinder of the front axle. Arrow 38 designates the pressure medium line to a wheel cylinder of the rear axle. Arrow 39 designates the pressure medium line to the second wheel cylinder of the front axle. The three arrows 40, 41, and 42 mark pressure medium lines to supply pressure medium from the pressure medium source to the channel system of the base plate of FIG. 3.

The pressure medium lines 40, 41, and 42 (FIG. 4) leading to the base plate (FIG. 3) correspond to the pressure medium supply lines as illustrated by arrow 34 in FIG. 3. The pressure medium lines 37, 38 and 39 correspond to the pressure medium line illustrated by arrow 35 in FIG. 3. Arrow 43 of FIG. 4 designates the pressure medium line to the unpressurized storage reservoir. The pressure medium line 43 of FIG. 4 corresponds to pressure medium line 36 of FIG. 3.

The valve block of FIG. 1 is a standard valve block with a paired arrangement of an SO valve and an SG valve. The distributing plate 13, together with the base plate 14, embodies a novel channel system, which can be adapted and designed in accordance with a client's wish.

The following pressure medium lines are discernible from FIGS. 1, 2, 3, and 4. The pressure medium supply of the rear axle wheel cylinders is described hereinafter with reference to FIGS. 1, 2, 3 and 4. Through line 40 (FIG. 4), or line 34 (FIG. 3), pressure medium is supplied from the pressure medium source to the connection 52 and the bore 44 in the base plate 14 as best shown in FIG. 3. Pressure medium will flow through bore 45 in the base plate 14 and through bore 46 (FIG. 2), or line 28 (FIG. 4), in the distributing plate 13 and into the SO valve 11 (FIG. 1).

The unit illustrated in FIGS. 1 through 4 is part of a braking pressure control device for anti-skid systems. In the normal braking mode, i.e., when there is no anti-skid control, the SO valve 11 will be in its open position whereas the SG valve 12 will be in its closed position. In this case, the pressure medium will flow through the open valve seat 47 into the bore 48 and, the SG valve 12 being closed, into bore 49. The pressure medium will flow through the punching 18 (see FIGS. 2 and 4) and into channel 50 of the base plate 14 (FIG. 3). The base plate has a connection 51 for the pressure medium line 35 to the rear axle wheel cylinder.

From FIG. 3 it is discernible that, apart from connection 51 to the wheel cylinder, the base plate also has connections 52 for the pressure medium source and 53 for the unpressurized storage reservoir. The connections and the following channels lie on a plane below the plane of the distributing plate 13 (FIG. 2). The preceding description was of the pressure medium lines from the pressure medium connections 52, or rather from the pressure medium supply line 34, to the pressure medium line 35 leading to the wheel cylinders of the rear axle. Pressure medium line 35 in this case corresponds to line 38 of FIG. 4.

The following description will be of the pressure medium lines for the two wheel cylinders of the front axle. In FIG. 4, arrow 41 illustrates the pressure medium line from the pressure medium source to the connection in the base plate of FIG. 3. Here, also, pressure medium will flow through bores, analogous to the bores 44 and 45 of FIG. 3, to the SO valve of valve pair 26. The pressure medium will reach the punching 17 (FIG. 4) through a channel system in the valve block, which channel system is designed analogously to the channel system 48 and 49 of FIG. 1. From the punching, the pressure medium will flow through a connection to one of the wheel cylinders of the front axle, through line 39 (FIG. 4) to be exact.

The pressure medium supply to the second wheel cylinder of the front axle will be effected as follows. Pressure medium will be supplied from the pressure medium source through line 42 to the punching 16 in an analogous way as illustrated in FIGS. 1 through 3, i.e., through the base plate, the intermediate plate, and the valve block. The punching 16 represents a connection to the pressure medium line 37 leading to the second wheel cylinder of the front axle. In this pressure medium path, the SO valve 30 which is in its open position is analogously integrated into the pressure medium line as in the previously described instances in context with the pressure medium supply to the first wheel cylinder of the front axle and to the wheel cylinder of the rear axle.

As illustrated, there are combined three valve blocks with one SO valve and one SG valve each. The three outlets 31, 32 and 33 of the SG valves are arranged in parallel (see FIG. 4) and end in a common punching 15 which represents the connection to the unpressurized storage reservoir through channels 54 and 55 in the base plate (see FIG. 3). In FIG. 3, arrow 36 represents the pressure medium lines to the storage reservoir. In the illustrated three pressure medium paths to the wheel cylinders of the front axle and the rear axle, the SG valves are always closed in the normal braking mode so that no pressure medium can flow into line 36 through the punching 15, the channels 54 and 55, and the connection 53.

In FIG. 5, a further embodiment is illustrated. Reference numeral 56 marks the receiving element for the solenoid valves and reference numeral 57 designates the cover of the valve block. Reference numeral 58 designates the plug assembly with the contact blades. Adjacent to the valve block, a base plate 59 is provided. Below the base plate, the distributing plate 60 is arranged. The distributing plate 60 has indented grooves 61 and 62. A hydraulic connection 63 is provided on the base plate 59. In this embodiment, the desired hydraulic connections between the pressure medium inlets and outlets of the solenoid valve and of the other components of the control device are formed by indented grooves representing hydraulic channels. The valve block, the base plate, and the distributing plate are connected with each other in a hydraulically tight manner, e.g., by means of screwing, welding, gluing, or soldering.

In the embodiment illustrated in FIG. 6, the distributing plate 64 is arranged in a sealing manner between two sealing plates 65 and 66. The entire unit, consisting of the valve block 57 and 56, sealing plates 65 and 66 with the distributing plate 64 inserted between them, is arranged on a hydraulic compact unit of an anti-skid control system. The compact unit is marked 67. In this embodiment, the distributing plate 64 may have the described punched grooves serving as hydraulic channels connecting the valves and hydraulic chambers with each other. The hydraulic channels and pressure medium inlets and outlets described above can be sealed by means of printed rubber seals. The rubber seals preferably are arranged on the distributing plate, base plate, or the sealing plates.

The described embodiments permit nearly any number of connections between the SO and SG valves, on the one hand, and the connections of the hydraulic compact unit of the anti-skid control device, on the other hand. The number of possible variations in manufacturing the hydraulic connections may even be increased by using several distributing plates which are fixed on one another in a sealing manner or by using a base plate with channels integrated into the design of the channel systems. Points of crossing of hydraulic channels are avoided in that the first channel lies on a plane below or above the second channel. Bridging of such points of crossing is therefore easily possible as the channel system can be realized on several planes. The sealing plates as illustrated in FIG. 6 may also have channels. Thereby the number of possible variations is even further increased.

Depending on the client's wishes and the desired number of pieces for hydraulic units equipped in accordance with this invention, it is also possible to manufacture the distributing plates by casting, such that the desired channel system may be cast in during the manufacturing process. The distributing plate and the base plate can also be manufactured in one piece.

In the preceding description, this invention was described with reference to several embodiments, this invention not being limited to the described embodiments. This invention may be embodied by further embodiments. The principle of using the distributing plate basically can always be applied in those instances where fixed pressure medium connections are provided, on the one hand, and where, however, individual demands, on the other hand, lead to pressure medium consumer connections of any arrangement which have to be connected with the fixed connections. The base plate allows universal use. It can be designed and enlarged so as to receive any number of valve pairs next to one another, the valve pairs consisting of SO and SG valves. On principle, the base plate can serve as a basis for receiving various hydraulic components, such as pipe connections, functional elements, etc.

What is claimed is:

1. A hydraulic unit for a hydraulic braking pressure control device comprising:
   at least one standardized valve block having a plurality of electromagnetically operable valves with pressure medium inlets and outlets disposed on an external surface of the valve block at predetermined standardized positions, said pressure medium inlets and outlets interconnected with one another through said valves forming a plurality of valve block fluid flow passages capable of being opened and closed by said valves;

a connection element having an external surface area with pressure medium inlets and outlets disposed thereon at random positions selected as required for a particular control device for connection with other external components of said control device, said pressure medium inlets forming a plurality of connection element fluid flow inlet passages and said pressure medium outlets forming a plurality of connection element fluid flow outlet passages, said inlet passages being separate and independent of said outlet passages;

at least one distributing element having pressure medium channel means for connecting the inlets and outlets of the valve block fluid flow passages with the other external components of the control device through said connection element inlet passages and outlet passages.

2. The hydraulic unit as claimed in claim 1, wherein the external surface of the valve block and an external surface of the distributing element are arranged so as to abut on each other such that the valve block and the distributing element form a channel system.

3. The hydraulic unit as claimed in claim 1, wherein the external surface of the connection element and an external surface of the distributing element are arranged so as to abut on each other such that the connection element and the distributing element form a channel system.

4. The hydraulic unit as claimed in claim 1, wherein external surfaces of the valve block, the distributing element, and the connection element are arranged so as to abut on each other such that the valve block, the distributing element, and the connection element form a channel system.

5. The hydraulic unit as claimed in claim 1, wherein the connection element is designed as a base plate to carry hydraulic connections for the control device.

6. The hydraulic unit as claimed in claim 5, wherein the base plate is an integral part of the control device.

7. The hydraulic unit as claimed in claim 5, wherein the base plate has channels forming a channel system together with the channel means of the distributing element.

8. The hydraulic unit as claimed in claim 5, wherein the base plate receives parts of the control device.

9. The hydraulic unit as claimed in claim 5, wherein the base plate receives parts of the control device.

10. The hydraulic unit as claimed in claim 5, wherein the base plate is arranged between the valve block and the distributing element.

11. The hydraulic unit as claimed in claim 1, wherein the distributing element is designed as a distributing plate with channels.

12. The hydraulic unit as claimed in claim 11, wherein the distributing plate has punchings forming channels.

13. The hydraulic unit as claimed in claim 11, wherein the distributing plate has indented grooves forming channels.

14. The hydraulic unit as claimed in claim 11, wherein the distributing plate is designed as a casting with channels produced during casting.

15. The hydraulic unit as claimed in claim 11, wherein the distributing plate is arranged between the valve block and the connection element.

16. The hydraulic unit as claimed in claim 11, wherein at least one sealing plate is provided which abuts on the distributing plate, which seals the channels of the distributing plate, and which has channels of its own which, together with the channels of the distributing plate, form a channel system.

17. The hydraulic unit as claimed in claim 11, wherein the distributing plate is arranged between two sealing plates.

18. The hydraulic unit as claimed in claim 11, wherein between the valve block and other components of two sealing plates are arranged which receive at least one distributing plate between them.

19. The hydraulic unit as claimed in claim 11, wherein between the valve block and the other components of two sealing plates are arranged which receive at least one distributing plate between them.

20. The hydraulic unit as claimed in claim 11, wherein a plurality of distributing plates are arranged in a combined package with channels forming a channel system.

21. The hydraulic unit as claimed in claim 20, wherein a distributing plate package is produced by soldering, in particular in a furnace.

* * * * *